3,139,411
POLYMER BLENDS OF VINYL POLYMERS WITH OIL-MODIFIED ALKYD RESINS
Francis Joseph Brockman and James David Murdock, St. Hilaire Station, Quebec, and Norman Nelan, Otterburn Park, Quebec, Canada, assignors to Canadian Industries Limited, Montreal, Quebec, Canada, a corporation of Canada
No Drawing. Filed May 2, 1960, Ser. No. 25,848
Claims priority, application Great Britain May 20, 1959
8 Claims. (Cl. 260—22)

This invention relates to novel coating compositions and, more particularly, to coating compositions based on blends of alkyd resins with vinyl copolymers, and to a process for preparing the same.

Coating compositions have previously been prepared by polymerizing vinyl monomers, such as styrene or methyl methacrylate, in the presence of alkyd resins. Both the method of preparation and the compositions so obtained suffered from a number of disadvantages. Thus, for example, in their preparation, so-called "kettle volume" for the vinylation reaction had to be allowed for during the alkyd cook, and molecular weight of the vinyl polymer was generally lower than desirable.

Probably with a view to avoiding these and other disadvantages, work directed to blending oil-modified alkyd resins with preformed vinyl polymers has in the past been carried out and reported. It has, however, been observed that oil-modified alkyd resins and vinyl polymers are generally incompatible with the result that films obtained from such blends are not homogeneous but turbid or opaque and possess mechanical properties inferior to those of films obtained from the separate constituents or from compositions prepared as described above. Even where the vinyl polymers are compatible severe limitations are encountered as to the amount of vinyl polymer which can be blended with the alkyd resin.

J. Hildebrand and R. Scott have shown in "The Solubility of Non-Electrolytes," 3rd edition, Reinhold Publishing Corp., New York (1949), that solubility parameters can be calculated for solvents and also for polymers. Furthermore, it has been shown that for two substances to be compatible, the difference between their solubility parameters must be small. Indeed, when two polymeric substances are considered the solubility parameter difference must be very small (it has been suggested less than 0.5) and even when solubility parameters are as closely matched as possible compatibility has not always been found.

It has now been discovered that certain special oil-modified alkyd resins containing basic or amido nitrogen atoms can be blended with vinyl copolymers despite a difference in solubility parameter of 2.0, or as much as 3.0, provided that the vinyl copolymers contain free carboxylic acid groups.

It is thus an object of this invention to provide new blends of alkyd resins and vinyl copolymers. Another object is to provide coating compositions based on such new blends as well as a process for preparing them. Additional objects will appear hereinafter.

The coating compositions of this invention comprise essentially admixtures of vinyl copolymers containing from 2 to 50 molar percent of an α,β-unsaturated carboxylic acid and from 98 to 50 molar percent of at least one copolymerizable neutral monomer, with oil-modified alkyd resins whose polyhydroxy components at least partially consist of alkyl amines having at least two substituent hydroxyl groups.

The compatibility of the above two types of polymeric materials makes available a series of new coating compositions of greater hardness and gloss than the compositions previously available, such as the vinylated alkyds. Furthermore, nitrogen resins of, for example, the urea-formaldehyde and melamine-formaldehyde types may be included in the coating compositions, with or without a catalyst, and the compositions are then adapted for hardening by baking into infusible and solvent resistant films. Pigments, dyes, fillers, etc., may also be included.

The process for preparing these superior coating compositions, which is also within the scope of this invention, comprises essentially admixing a vinyl copolymer containing from 2 to 50 molar percent of an α,β-unsaturated carboxylic acid and from 98 to 50 molar percent of at least one copolymerizable neutral monomer with an oil-modified alkyd resin whose polyhydroxy component at least partially consist of an alkyl amine having at least two substituent hydroxyl groups.

Examples of the above type of alkyd resins are those prepared from drying oils modified with tris-hydroxymethylaminomethane. In United States Patent No. 2,373,250, it is shown that tris-hydroxymethylaminomethane may be reacted with drying oil acids to yield a special drying oil. It is thus apparent, in the light of this patent and the known techniques for preparing alkyd resins, that any alkyl amine having at least two, and preferably three, hydroxyl groups may be reacted with a drying oil and phthalic anhydride or other suitable dibasic carboxylic acid to yield an alkyd resin containing amido and/or basic nitrogen atoms.

The normal components of alkyd resins are well known, being a polycarboxylic acid such as phthalic or maleic anhydride, fumaric or adipic acid or the like, a polyhydroxy compound such as ethylene glycol, glycerol, pentaerythritol, sorbitol or mannitol, and a natural oil such as linseed, cottonseed, soya bean, tung, oiticica or modified castor oil. In general, suitable oil lengths for alkyd resins are obtained by using from about 25% to 70% by weight of oil, and this oil is cooked with, for example, sufficient glycerol to give the monoglyceride, the two remaining hydroxyl groups being esterified by addition of the polycarboxylic acid to the alkyd cook. It can thus be seen that in order to prepare the alkyd resins for use in this invention, the tris-hydroxymethylaminomethane may be used mole for mole to replace the glycerol. On the other hand, if an alkyl amine having only two hydroxyl groups is used, it is apparent that some pentaerythritol or similar polyol must also be included.

Examples of suitable alkyl amines for incorporation in the alkyd resins of this invention are: tris-hydroxymethylaminomethane, diethanolamine, triethanolamine, 2-aminoropanediol, tris-hydroxyethylaminomethane, etc. In general, the proportion of amine in the resins should not fall below that which yields about 0.03 equivalent of basic or amido nitrogen, expressed as —NH$_2$ (monobasic) per 100 g. of resin.

Examples of vinyl copolymers suitable for the purpose of this invention are copolymers of such acids as acrylic, methacrylic, fumaric, maleic or crotonic acid and neutral monomers such as styrene, alkylated styrenes, acrylate and methacrylate esters. Minor proportions of such monomers as acrylonitrile may also be included. A suitable method for preparing these copolymers is described hereinafter.

The compatibility of the alkyd resins and vinyl (also referred to as acrylic) copolymers of this invention allows for the production of useful coating compositions from blends of the two components in any proportions. For example, either component may be present in a concentration ranging from 1% to 99% by weight of the blend. However, blends containing from 10% to 50% by weight of vinyl copolymer are preferred.

The proportion of unsaturated carboxylic acid in the vinyl copolymer may be varied widely. Not more than 50 molar percent of the copolymer should consist of the acid since, otherwise, the copolymer may gel. As little as 3%, or even 2%, of the carboxyl-containing monomer will yield a compatible copolymer in some cases, although it is desirable that the carboxyl groups be evenly distributed amongst the copolymer molecules when low percentages are used.

The invention will be further illustrated but is not to be limited in scope by the following Example:

EXAMPLE

A nitrogen-containing alkyd resin was prepared having the following composition.

Long oil alkyd: Percent by weight
Tris-hydroxymethylaminomethane _____ 21.6
Phthalic acid anhydride_____ 22.2
Soya fatty acid_____ 66.3
Water of reaction distilled off_____less__ 10.1
                                              _____
                                              100.0

The resin was formed by cooking the ingredients in the specified proportions in a conventional kettle for approximately 4 hours at 205° C. under nitrogen. The resulting resin had an acid No. of 8.6, a solubility parameter of 8.9 and contained approximately 0.172 equivalent of $NH_2$ per 100 g. polymer.

Another resin was prepared having the composition.

Medium oil alkyd: Percent by weight
Tris-hydroxymethylaminomethane _____ 25.8
Phthalic acid anhydride_____ 33.6
Soya fatty acid_____ 51.9
Water of reaction distilled off_____less__ 11.3
                                              _____
                                              100.0

The cooking was similar to that of the long oil alkyd and the resulting resin had an acid No. of 11.0 and a solubility parameter of 9.4.

A copolymer containing 92% by weight of vinyl toluene and 8% by weight of acrylic acid was prepared as follows: 2550 g. of xylene and 450 g. of butanol were brought to reflux in a vessel equipped with a reflux condenser and a stirrer and the following four mixtures were added over successive 15 minute periods:

*Mixtures*

|  | 1 | 2 | 3 | 4 |
|---|---|---|---|---|
| Vinyl toluene_____grams__ | 750 | 750 | 750 | 750 |
| Acrylic acid_____grams__ | 40 | 53 | 67 | 80 |
| Benzoyl peroxide_____grams__ | 7.5 | 7.5 | 7.5 | 7.5 |
| t-Butyl hydroperoxide_____grams__ | 7.5 | 7.5 | 7.5 | 7.5 |

The copolymer was obtained after the reaction had proceeded under reflux for a further four hours and had a solubility parameter of 9.3.

The other copolymers shown in Table I were prepared in a similar manner.

Attempts were made to blend the vinyl copolymers with each of the two alkyds described above. From the mixed solutions a film was drawn, and compatibility was judged from the clarity of this resulting film as measured by the well-known Gardner Haze reading. Complete compatibility was indicated by a haze reading of close to zero, while incompatibility showed itself not only in hazy films, but in obviously non-homogeneous ones. The results are given in Table I wherein the following abbreviations are used:

VT—vinyl toluene
MMA—methyl methacrylate
DMAEMA—dimethylaminoethylmethacrylate
AA—acrylic acid
AAm—acrylamide
$d$—solubility parameter
$\Delta d$—difference in $d$
I—incompatible

TABLE I

| Vinyl copolymer | Solubility Parameter $d$ | Long Oil Alkyd—Solubility Parameter 8.9 | | Medium Oil Alkyd—Solubility Parameter 9.4 | |
|---|---|---|---|---|---|
| | | Gardner Haze | $\Delta d$ | Gardner Haze | $\Delta d$ |
| VT/DMAEMA 92/8 | 8.5 | 18 | .4 | 56 | .9 |
| VT/MMA/DMAEMA 60/32/8 | 9.2 | 1.3 | .3 | 0 | .2 |
| MMA/DMAEMA 92/8 | 11.0 | 1 | 2.1 | 45 | 1.6 |
| VT/AAm 90/10 | 9.5 | 39.7 | .6 | 1.0 | .1 |
| VT/AA 92/8 | 9.3 | 0 | .4 | 0 | .1 |
| VT/MMA/AA 50/42/8 | 10.5 | 0 | 1.6 | 0 | 1.1 |
| MMA/AA 90/10 | 12.0 | | | 0 | 2.6 |

From these results it can be seen that the compatibility of an alkyd resin and a vinyl polymer is not improved by the inclusion of basic groups in each, but that blends can be formed even when the solubility parameter difference is as high as 2.6 if the vinyl polymer contains free carboxylic acid groups. Hitherto alkyd resins and vinyl polymers have only been found to blend when their solubility parameters matched as closely at 0.5 or closer, and thus the process and products of this invention open a new field of formulation to the paint chemist.

What we claim is:

1. A coating composition which comprises, as the essential organic film-forming component thereof, a preformed copolymer containing from 2 to 50 molar percent of a copolymerized $\alpha,\beta$-ethylenically unsaturated carboxylic acid and from 98 to 50 molar percent of at least one copolymerized monomer selected from the group consisting of alkylated styrenes and methacrylate esters, in admixture with an oil-modified alkyd resin which is the reaction product of a polycarboxylic acid, a monocarboxylic acid and a polyhydroxy reactant consisting at least partially of an alkyl amine having at least two substituent hydroxyl groups.

2. A coating composition as claimed in claim 1 wherein the polyhydroxy reactant of the alkyd resin at least partially consists of tris-hydroxymethylaminomethane.

3. A coating composition as claimed in claim 1 wherein the alkyd resin contains at least 0.03 equivalent of basic nitrogen, expressed as $-NH_2$, per 100 grams of resin.

4. A coating composition as claimed in claim 3 wherein the polyhydroxy reactant of the alkyd resin at least partially consists of tris-hydroxymethylaminomethane.

5. A process for preparing a coating composition which comprises, essentially, admixing a preformed copolymer containing from 2 to 50 molar percent of a copolymerizer $\alpha,\beta$-ethylenically unsaturated carboxylic acid and from 98 to 50 molar percent of at least one copolymerized monomer selected from the group consisting of alkylated styrenes and methacrylate esters, with an oil-modified alkyd resin which is the reaction product of a polycarboxylic acid, a monocarboxylic acid and a polyhydroxy reactant consisting at least partially of an alkyl amine having at least two substituent hydroxyl groups.

6. A process as claimed in claim 5 wherein the polyhydroxy reactant of the alkyd resin at least partially consists of tris-hydroxymethylaminomethane.

7. A process as claimed in claim 5 wherein the alkyd resin contains at least 0.03 equivalent of basic nitrogen expressed as —$NH_2$, per 100 grams of resin.

8. A process as claimed in claim 7 wherein the polyhydroxy reactant of the alkyd resin at least partially consist of tris-hydroxymethylaminomethane.

References Cited in the file of this patent
UNITED STATES PATENTS

| | | |
|---|---|---|
| 2,048,778 | Brubaker et al. | July 28, 1936 |
| 2,731,449 | Rowland et al. | Jan. 17, 1956 |
| 2,852,477 | Greenlee | Sept. 16, 1958 |
| 2,886,551 | McNulty et al. | May 12, 1959 |
| 3,023,177 | Boucher | Feb. 27, 1962 |